United States Patent [19]

Weigele

[11] 4,301,566
[45] Nov. 24, 1981

[54] APPARATUS FOR CONTROLLING THE MOVEMENTS OF A ROLLER-LIKE HORIZONTAL ROTARY WASHING BRUSH IN MOTOR VEHICLE WASHING APPARATUS

[76] Inventor: Gebhard Weigele, Am Schoenblick 1a, 8901 Taefertingen, Fed. Rep. of Germany

[21] Appl. No.: 81,610

[22] Filed: Oct. 3, 1979

[30] Foreign Application Priority Data

Nov. 16, 1978 [DE] Fed. Rep. of Germany ... 7834006[U]

[51] Int. Cl.³ .............................................. B60S 3/06
[52] U.S. Cl. ................................ 15/53 A; 15/DIG. 2
[58] Field of Search ............ 15/53 A, 53 AB, DIG. 2

[56] References Cited

U.S. PATENT DOCUMENTS

| 3,510,899 | 5/1970 | Vollenweider et al. | 15/53 A |
| 3,593,358 | 7/1971 | Hofmann | 15/53 AB |
| 3,725,967 | 4/1973 | Capra | 15/53 A |

FOREIGN PATENT DOCUMENTS 563261  6/1975  Switzerland .................... 15/DIG. 2

Primary Examiner—Edward L. Roberts
Attorney, Agent, or Firm—Blanchard, Flynn, Thiel, Boutell & Tanis

[57] ABSTRACT

In a portal-type washing arrangement for vehicles, one of the rotary mountings for a horizontal rotary washing brush is arranged at the lower end of a vertically downwardly hanging swinging arm. The upper end of the swinging arm is connected to a first carriage which is vertically displaceable on a vertical guide rail of the portal assembly. Disposed in the region of movement of the swinging arm is a switching arrangement which controls a control motor. The control motor is connected by way of flexible traction means to the first carriage and to a second carriage which is vertically displaceable on a further vertical rail on the portal assembly. The other rotary mounting of the washing brush is directly and rigidly connected to the second carriage.

4 Claims, 3 Drawing Figures

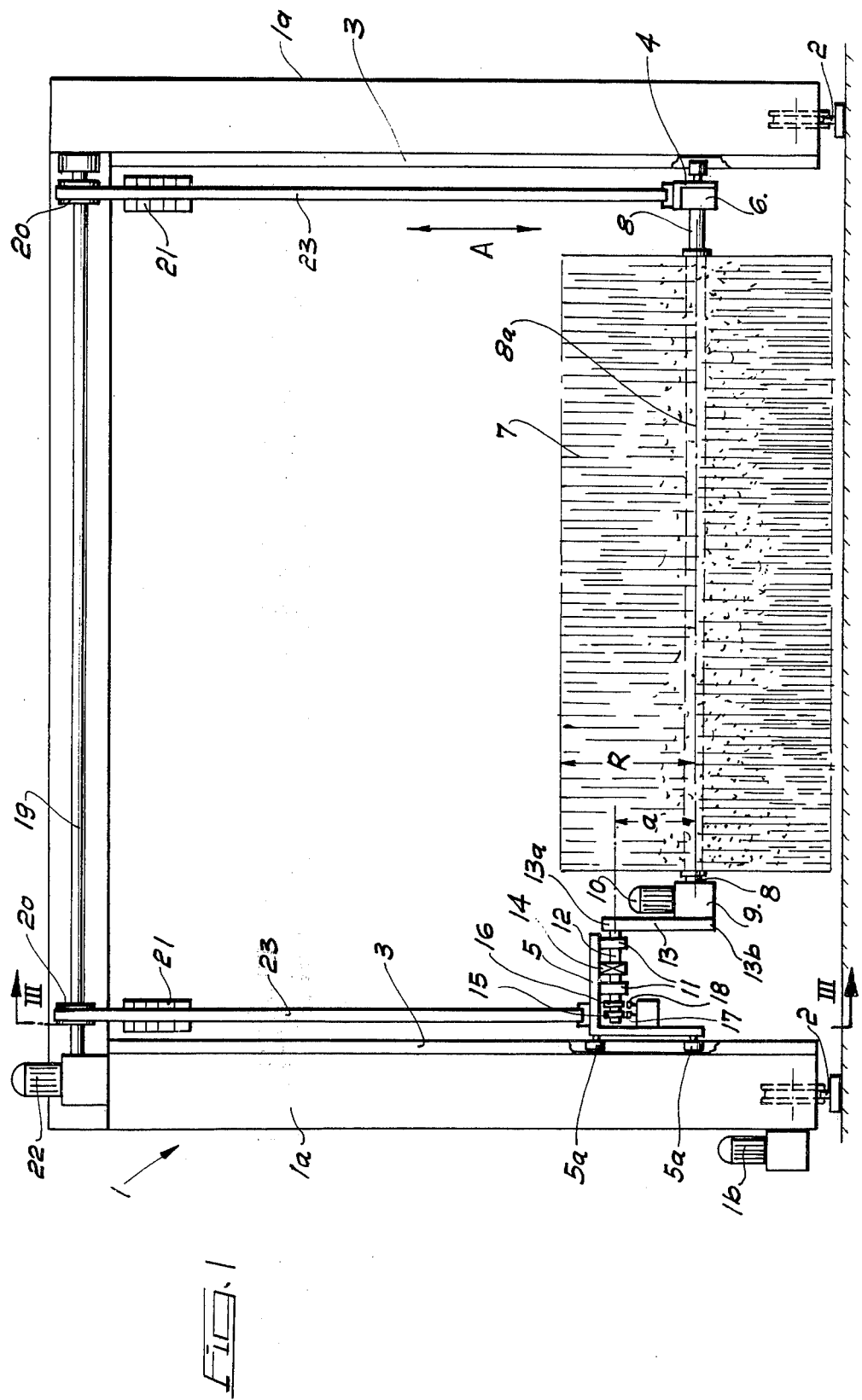

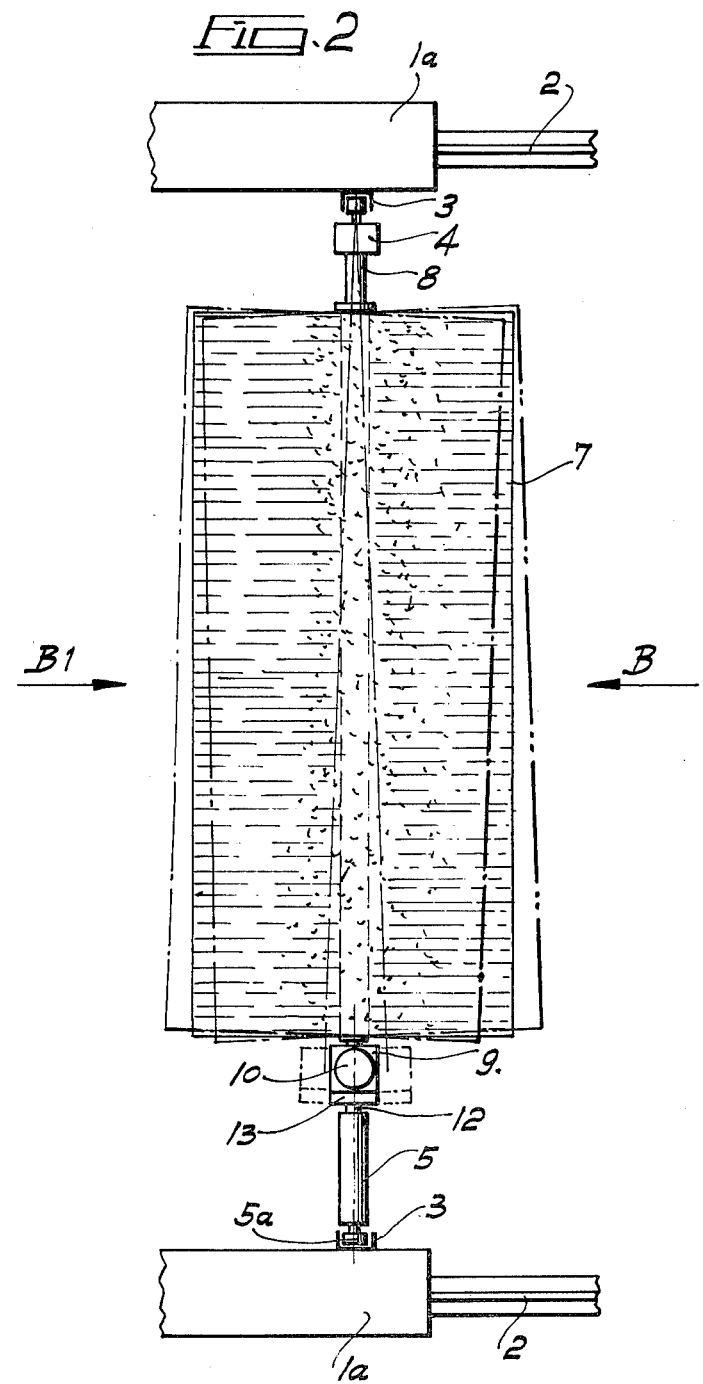

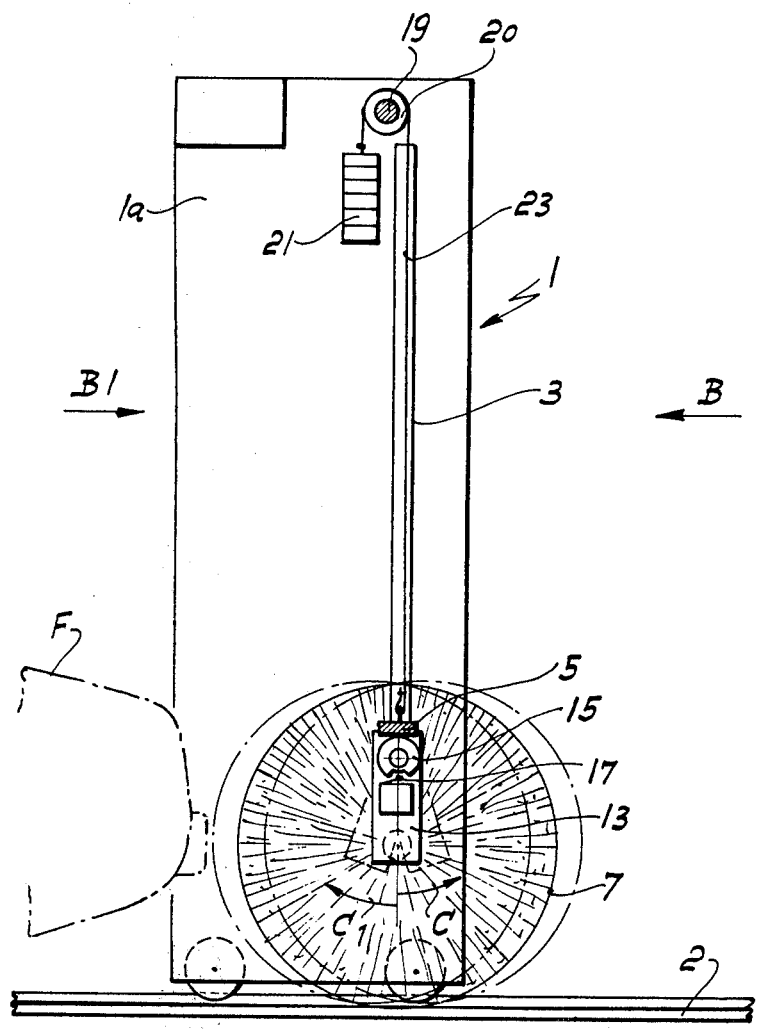

APPARATUS FOR CONTROLLING THE MOVEMENTS OF A ROLLER-LIKE HORIZONTAL ROTARY WASHING BRUSH IN MOTOR VEHICLE WASHING APPARATUS

FIELD OF THE INVENTION

The invention relates to apparatus for controlling the movements of a roller-like horizontal rotary washing brush in a motor vehicle washing apparatus in which the vehicle to be washed is moved relative to a portal assembly and in which the rotary mountings which are provided at both ends of the horizontal washing brush are each vertically movably mounted by means of a respective carriage which is guided in a vertical guide rail, wherein the washing brush is additionally mounted in such a way that it can be deflected in the direction of movement of the vehicle against a return force, and wherein there is a switching arrangement which is dependent on the deflection movement of the washing brush and controls a control motor which acts on the carriages.

BACKGROUND OF THE INVENTION

In motor vehicle washing equipment, the vehicle is moved relative to the washing assembly, wherein either the vehicle is pulled through the washing assembly by means of a conveyor belt or a portal assembly which carries the washing brush is moved with respect to the stationary vehicle. In such arrangements, the horizontal washing brush, whose axis is arranged transversely with respect to the direction of relative movement must be lifted from its lowest position, in which it washes the front of the vehicle at the level of the bumpers, up to the level of the roof, and then is lowered again when washing the rear of the vehicle. In order to raise and lower the washing brush, the apparatus has a control motor which acts by way of a transmission means and drive rollers on a conveyor cable, chain or the like which is connected to the carriages of the washing brush. A control means which is dependent on the deflection movement of the washing brush is provided for controlling the control motor.

Swiss Pat. No. 443 940 discloses apparatus of the above-indicated kind. In this known portal-type washing apparatus, the horizontal washing brush is mounted in a frame which is supported on respective sides in respective carriages which are pivotal about an axis extending transversely with respect to the direction of movement of the portal assembly. The frame has switching cam members which co-operate with a limit switch disposed on the carriage. As long as the horizontal washing brush is not in contact with the vehicle, the two pivot arms which form a part of the frame hand vertically downwardly. As soon as the vehicle bears against the brush, the frame is pivoted about its horizontal pivot axis and the cam members actuate the limit switch. The limit switch switches on the control motor and causes the washing brush to be lifted, together with the frame. Instead of the switching cam members, it is also possible to use a plurality of switches which can be actuated by permanent magnets. A disadvantage with these known arrangements is that a relatively stable frame comprising two pivot arms and a transverse yoke member must always be provided, with the frame being supported at both sides in a respective carriage for pivotal movement about a horizontal axis. The frame must be of a stable construction because it must carry the weight of the horizontal washing brush and also carry the forces acting thereon.

The invention is based on the problem of providing apparatus for controlling the movements of a roller-like horizontal rotary washing brush in vehicle washing equipment of the above-indicated kind, wherein the means supporting the brush are of a substantially simpler construction.

SUMMARY OF THE INVENTION

According to the invention, this is achieved in that only one of the rotary mountings is arranged at the lower end of a vertically hanging swinging arm, the upper end of which arm is connected to a carriage for pivotal movement about a horizontal pivot axis member which extends substantially parallel to the axis of rotation of the brush, while the other rotary mounting is rigidly connected to the associated second carriage, and in that a switching arrangement is disposed in the region of pivotal movement of the swinging arm or in the region of rotary movement of its pivot axis member.

This arrangement provides for a substantial simplification in the apparatus for controlling the movements of the washing brush. At one end, the washing brush is mounted directly in the associated carriage. With this arrangement, it is possible to omit a frame which connects the two carriages and which carries the washing brush. The omission of a pivotal frame for carrying the brush also reduces the manufacturing costs of the apparatus. Furthermore, the lack of the pivotal frame also has an advantageous effect for reasons of space. In addition, it was surprisingly found that the washing brush which is mounted so that it can be deflected only at one side provides for more precise switching functions and thus quickly and precisely follows the contour of the vehicle to be washed.

An advantageous embodiment of the invention provides that the distance of the pivot axis of the swinging arm from the axis of rotation of the brush is less than the radius of the brush. It was found that, with this construction, the means for controlling the movements of the brush operates with a very high degree of accuracy and the washing brush quickly and precisely follows the contours of the vehicle to be washed. This is evidently because, when the swinging arm is of a comparatively short length, the return force produced by the force of gravity, for returning the washing brush, rises rapidly when the swinging arm is deflected, and therefore, after the arm has been deflected and after the vertical position of the washing brush has been corrected by the control motor, and swinging arm is also rapidly returned to its starting position. It then remains in its starting position, in a comparatively stable manner, as long as the washing brush is not subjected to any displacement forces caused by the contour of the vehicle.

It is also desirable for the swinging arm to be additionally held in its vertically hanging starting position by the return force of a spring assembly. This arrangement provides that the stabilizing effect of the short swinging arm is further enhanced.

In addition, in another advantageous embodiment, it is advantageous for a rubber torsion spring which engages the pivot axis member of the swinging arm to be provided for returning the swinging arm to its vertically hanging starting position. The rubber torsion spring takes up a small amount of space and is also not liable to suffer from corrosion. The term rubber torsion spring in this context is used to denote a spring assembly comprising an outer ring and an inner ring which is arranged concentrically thereto, with rubber or rubber-elastic material disposed between the two rings and being vulcanised on to the two rings. The inner ring is non-rotatable with respect to the pivot axis member, while the outer ring is non-rotatable with respect to a housing.

BRIEF DESCRIPTION OF THE DRAWING

The invention is described in greater detail hereinafter with reference to an embodiment which is shown in the drawing in which:

FIG. 1 shows a front view of a portal-type washing arrangement with the apparatus according to the invention, FIG. 2 shows a plan view of the portal-type washing arrangement, and FIG. 3 shows a view in cross-section taken along line III—III in FIG. 1.

DETAILED DESCRIPTION

Referring to the drawing, reference numeral 1 denotes a portal assembly which is mounted on rails 2 for reciprocating motion in directions B and B1 (FIG. 2), by means of the travel motor 1b. Secured to each of the two vertical uprights 1a of the portal assembly is a respective vertical guide rail 3 in which a respective carriage 4 and 5 is mounted for movement in direction A (FIG. 1). One carriage 4 (the right-hand carriage in FIG. 1) is directly connected to the rotary mounting 6 of the shaft 8 of the horizontal washing brush 7. In the apparatus according to the invention, the carriage 4 may comprise a single roller. In contrast, the other carriage 5 (the left-hand carriage) is guided in the rail 3 by means of two rollers 5a. The carriage 5 carries the mountings 11 for a pivot axis member 12 which is connected to the upper end 13a of a swinging arm 13 which, in the starting position, hangs vertically downwardly. A rubber torsion spring 14 also engages the pivot axis 12 of the swinging arm 13, the return force of the spring 14 urging the swinging arm 13 into its vertically hanging starting position. In this arrangement, the return force of the rubber spring 14 assists the return force caused by the force of gravity.

The transmission means 9 of the motor 10 for driving the brush 7 is flange-connected to the lower end 13b of the swinging arm 13. The transmission means 9 also simultaneously includes the second rotary mounting for the shaft 8 of the brush. The distance a of the pivot axis of the member 12 from the axis 8a of rotation of the brush 7 is desirably less than the radius R of the brush. The distance a may be ½ to ⅔ of the radius R of the brush.

Two cam discs 15 and 16 which co-operate with switches 17 and 18 on the carriage 5 are also disposed on the pivot axis member 12. The cam discs 15 and 16 in this arrangement are of such a form that neither of the switches 17 and 18 is actuated when the swinging arm 13 is in the vertically handing position.

Each carriage 4 and 5 is also engaged by a toothed belt 23 (or a chain or a traction cable). Each of the toothed belts 23 is passed over a pinion 20 which is arranged on the control shaft 19. A counterweight 21 is suspended on the second end of each toothed belt 23 in known manner, for compensating for the weight of the washing brush 7 and the parts which are connected to the washing brush, such as the drive motor 10, the transmission means 9 and the carriages 4 and 5, except for a residual weight of about 2 to 6 kg. The control shaft 19 is driven by means of a control motor 22, by way of an interposed transmission means (not shown) and free wheel. The nature of this drive means is described for example in DAS No. 25 18 718. The control motor 22 is controlled by the cams 17 and 18. In practice, generally contact-less switches, such as for example reed contact switches which are controlled by means of permanent magnets, may be used instead of switching cams 15 and 16.

OPERATION

The mode of operation of the novel apparatus is as follows:

As long as the washing brush 7 is only rotating and is still not in contact with the vehicle to be washed, the washing brush 7 is in the position shown in FIGS. 2 and 3 in solid lines, with the swinging arm 13 hanging substantially vertically downwardly. When now the portal assembly moves towards the left in the direction indicated by arrow B in FIG. 3, the washing brush 7 comes into contact with the vehicle F. As soon as the pressure applied to the vehicle by the brush exceeds a value which is determined by the spring assembly 14, the swinging arm 13 is pivoted towards the right, in the direction C. This causes the switching cam of the cam disc 15 to come into contact with the switch 17 which then starts the motor 22. The motor 22 now causes the carriages 4 and 5 and the washing brush 7 carried thereby, to be lifted, by way of the pinion 20 and the two toothed belts 23. The lifting movement continues until the brush has been lifted over the vertical front part of the vehicle F, whereupon the pressing force on the brush 7 in the direction B decreases again and thereby the swinging arm returns to its vertically downwardly hanging rest position, under the influence of the force of gravity acting on the brush 7, the transmission means 9 and the motor 10, assisted by the return force of the spring assembly 14. This causes the cam disc 15 to return to its starting position shown in FIG. 3, and the switch 17 is no longer pressed. The arrangement could be such that, when the switch 17 is not pressed, the motor 22 is stopped. It is better, however for the motor 22 to be reversed so as to rotate in its opposite direction, which causes the brush to be lowered, and to continue to be driven in that direction while the switch 17 is not pressed, in accordance with the control action described in DAS No. 25 18 718. For that purpose, it is then necessary to provide a free wheel assembly between the control motor 22 and the control shaft 19, the free wheel assembly releasing the drive connection between the control motor 22 and the control shaft 19 as soon as the control motor 22 is driven in the 'lower' direction of rotation and as soon as the output shaft of the motor is rotating at a higher speed than the control shaft 19. Conversely, the free wheel assembly locks as soon as the control motor 22 is driven in the 'raise' direction of rotation.

The cam disc 16 shown in FIG. 1 has switching cams on both sides, which come into contact with the switch 18 only when the swinging arm 13 or the pivot axis member 12 has moved through a large angle of pivotal movement. A greater deflection movement of the swinging arm 13 occurs, for example, when the portal assembly 1 is moved at an excessively high speed in the direction B relative to the vehicle to be washed, and the control motor cannot raise the washing brush sufficiently quickly or sufficiently far. This situation occurs in particular if a larger, vertical or approximately vertical front surface of a vehicle has to be washed, such as for example the front of a VW transporter or bus. In this case, the switch 18 is pressed by the switching cam of the second cam disc 16 and stops the travel motor 1b of the portal assembly, while the control motor 22 continues to be driven in the 'raise' direction of rotation. The travel motor 1b of the portal assembly is stopped until, when the washing brush reaches the upper edge of the vertical surface of the vehicle, the pressure as between the brush and the vehicle decreases again and the swinging arm 13 is returned to its vertical starting position.

In portal-type washing arrangements in which the portal assembly 1 is moved and the vehicle is stationary, the portal assembly is first moved beyond the vehicle in one direction, and then the direction of movement of the portal assembly is reversed and the vehicle is washed again in the opposite direction. This means that, after the vehicle F has been washed in the direction of movement B, the portal assembly is reversed in its direction of movement and moves in the direction indicated by arrow B1. As soon as the pressure between the washing brush 7 and the vehicle exceeds the set value, the swinging arm 13 is pivoted in the opposite direction C1 and the control motor 22 or the travel motor 1b are then controlled by means of the cam discs 15 and 16 respectively, when the portal assembly is moving rearwardly in direction B1, in the same manner as when the portal assembly was moving forwardly in direction B.

Use of the novel apparatus is not restricted to portal-type washing arrangements in which the portal assembly is moved backwards and forwards and the vehicle is stationary during the washing operation. The novel apparatus can equally well be used for a washing arrangement in which the vehicle passes through, wherein the portal assembly is rigidly mounted and the vehicle is drawn through the portal assembly by suitable conveyor means.

In addition, switching cams or switch actuating means may also be arranged directly on the pivoting arm.

Instead of a control arrangement with a free wheel assembly, it would also be possible to use a control arrangement without such a free wheel assembly. In that case, the switching arrangement would be so designed that, when the swinging arm is in the vertical position, the control motor is driven in the 'lower' direction of rotation. If the swinging arm were to be slightly deflected from its vertical starting position, the control motor would be stopped, corresponding to a second position of the cam disc 15. If the swinging arm were subject to a greater degree of deflection, the control motor would be driven in the 'raise' direction of rotation, while, if the swinging arm were pivoted through an extremely large angle, the travel motor of the portal assembly would additionally be stopped, as described above.

The embodiments of the invention in which an exclusive property or privilege is claimed are defined as follows:

1. In an apparatus for controlling the movements of a roller-like horizontal rotary washing brush in a motor vehicle washing apparatus which includes a portal assembly supported for movement relative to a vehicle to be washed, said portal assembly having vertical guide rails, having a carriage guided for vertical movement in each said guide rail, and having rotary mountings which rotatably support respective ends of said horizontal washing brush and are each supported vertically movably by a respective said carriage which is guided in a said vertical guide rail, which includes first means for supporting said washing brush in such a way that it can be deflected in the direction of said relative movement of the vehicle against a return force, and which includes a control motor operatively coupled to said carriages and switching means responsive to said deflection of said washing brush for controlling said control motor which is operatively connected to said carriages, the improvement comprising wherein said first means includes a swinging arm, one of said rotary mountings being arranged at a lower end of said swinging arm and the upper end of said swinging arm being supported on said carriage associated with said one rotary mounting for pivotal movement about a substantially horizontal pivot axis member which extends substantially parallel to the axis of rotation of said washing brush, wherein the other said rotary mounting is rigidly connected to said carriage associated therewith, and wherein said switching means is disposed in the region of said swinging arm and pivot axis member.

2. The apparatus according to claim 1, wherein the distance of the pivot axis of said swinging arm from the axis of rotation of said washing brush is less than the radius of said washing brush.

3. The apparatus according to claim 1 or claim 2, wherein said first means further includes resilient means for urging said swinging arm toward a substantially vertical starting position.

4. The apparatus according to claim 3, wherein said resilient means includes a rubber torsion spring which engages said pivot axis member of said swinging arm for urging said swinging arm toward said substantially vertical starting position.

* * * * *